3,077,457
Patented Feb. 12, 1963

3,077,457
FUMARIC ACID ESTER SPACE DEODORANT AND METHOD OF USING SAME
Kurt Kulka, New York, N.Y., assignor to Fritzsche Brothers, Inc., New York, N.Y., a corporation of New York
No Drawing. Filed Apr. 15, 1960, Ser. No. 22,413
17 Claims. (Cl. 252—305)

This invention relates to deodorization of spaces and more particularly to methods and compositions for deodorization of spaces.

Various methods and substances have been utilized for the deodorization of malodors arising in kitchens, bathrooms, sickrooms, smoke-filled living rooms and spaces saturated with odors stemming from perspiration of men and household pets. Some of these methods and deodorants have depended upon the masking of the malodors by the impairment of smell. The use of formaldehyde is an example of such masking. Other methods involve superimposing the malodor with another stronger odor. Still other methods employ masking by neutralization with certain odoriferous compositions which have the property when added to a malodor of affecting a weaker odor instead of an enhanced odor as might be expected by such addition. All of these methods as well as those utilizing the adsorption of the malodors on surfaces of materials such as carbon or those entailing the oxidation of the malodor have serious drawbacks. The adsorption of malodors is not practical and is almost impossible to apply without specialized equipment in the deodorization of a room since the gaseous content of the room must be brought in contact with the solid sorption medium. To be sure, deodorization utilizing oxidation is effective; however, it is impractical and might even present problems of fire hazard and toxicity. The masking by impairing the sense of smell usually produces significant irritation of the smelling nerves. On the other hand, superimposing one odor over the malodor frequently results in a combined sickening odor which is sometimes more repellant than the malodor itself. Finally, masking by neutralization is ineffective because of the large amount of diversified malodors which are encountered in the deodorization of spaces.

In accordance with this invention, deodorization of a space is effected with a deodorant which does not impair the sense of smell and which, at the level of use, is not toxic to man and domesticated animals. The action of the deodorants of this invention does not depend upon superimposing the malodor with another, masking the malodor by neutralization or adsorption or oxidation of the malodor. Rather, the compositions employed as deodorants in the practise of this invention are capable of undergoing chemical reactions with a great number of functional groups such as those contained in some of the components of the malodors frequently encountered in spaces.

An object of this invention is to deodorize a space effectively and efficiently by chemical reactions with the malodors.

This invention involves the deodorization of a space by spraying into the space a deodorant comprising a di-ester of fumaric acid dissolved in a solvent, such as an alcohol, a glycol or a hydrocarbon. The ester is propelled by the solvent or a propellant, or both, as commonly used in the "aerosol" type of spray. Other spray type equipment may be used, such as atomizers or household sprayers. In such cases, air would be the customary propellant. The propellant which may also be the solvent for the ester is usually gaseous under normal conditions of pressure and temperature but is adapted to be non-gaseous at normal temperatures by application of pressure. Examples of propellants are nitrogen and halogenated hydrocarbons such as trichloro-monofluoro-methane and dichloro-difluoro-methane.

The di-ester of fumaric acid may be a di-alkyl ester of fumaric acid, such as di-butyl-fumarate or di-hexyl fumarate; a di-alkylene ester, such as geranyl fumarate; an aralkyl ester, such as di-benzyl fumarate; or a di-aryl fumarate. The esters of fumaric acid employed as a deodorant and in the practise of this invention are prepared by conventional methods such as esterification of an alcohol with the fumaric acid, by an exchange reaction of a lower molecular weight ester of the acid with a higher alcohol in which the formed lower alcohol is distilled off, or by the reaction of the acyl chloride of fumaric acid with the alcohol. Desirably, the alcohol reactant has at least 4 carbon atoms.

The concentration of the di-ester of fumaric acid in the propellant may vary over wide limits. Usually at least 0.5 or 1% and up to 5% of the di-ester of fumaric acid is desirably employed and generally at least 75% or 80% of the propellant is preferably used. In some situations, higher concentration of the ester may be used. Instead of a single di-ester of fumaric acid, a plurality of di-esters of fumaric acid may be employed.

The characteristics of the di-esters of fumaric acid render them especially effective deodorants in the practise of this invention. These esters are substantially non-irritating; they generally lend themselves well to be perfumed, giving the final product a desired odoriferous note if required. The di-esters, moreover, are miscible with the usual propellants and solvents employed for spraying. Finally, they are stable under normal conditions of use.

While the exact mechanism of reaction of the di-esters of the deodorants of this invention is not conclusively proved, it is believed that, if a propellant containing a di-ester of fumaric acid is introduced into a space containing a malodor, such di-ester which is highly activated because it is released in a finely divided state, readily undergoes chemical reaction with the components of the malodors. Since such di-esters are known to react readily with many functional groups, the malodors containing such functional groups are reacted with the di-esters to form compounds which are devoid of the malodor from which they are derived.

The deodorants comprising the solvent or propellant and the di-ester of fumaric acid used in the practise of this invention may be augmented with other materials, such as mono or polyhydric alcohols, hydrocarbons and perfumes.

The deodorants of this invention may be prepared in the same manner as other aerosol compositions are produced, such as the aerosol parasiticides described, for example, in U.S. Patent 2,321,023, granted to the Secretary of Agriculture as assignee of L. D. Goodhue et al. on June 8, 1943. In the practise of the present invention, a compatible propellant should be utilized and, instead of the parasiticide of the Goodhue et al. patent, there is employed a di-ester or di-esters of fumaric acid with any other desired augmented component or components.

A more comprehensive understanding of this invention is obtained by reference to the following examples:

*Example 1*

A room deodorant is prepared, having the following composition:

2 parts by weight of commercially available di-butyl fumarate
12.5 parts by weight of isopropyl alcohol
4.0 parts by weight of triethylene glycol
3.0 parts by weight of propylene glycol
80.0 parts by weight of a mixture of equal parts of trichloro - monofluoro - methane and dichloro - difluoromethane The composition is placed in an aerosol dispenser or it may be employed as a household spray by substituting a solvent, such as isopropyl alcohol or an alkane for the halogenated alkane propellant.

*Example 2*

A room deodorant is prepared having the following composition:

2 parts by weight of di-hexyl fumarate
12.5 parts by weight of isopropyl alcohol
4.0 parts by weight of triethylene glycol
3.0 parts by weight of propylene glycol
80.0 parts by weight of a mixture of equal parts of trichloro - monofluoro - methane and dichloro - difluoro - methane The composition is placed in an aerosol dispenser.
The di-hexyl fumarate was prepared as follows:
There was placed in a distilling flask equipped with a condenser the following:

| | |
|---|---|
| Fumaric acid _____g__ | 58 |
| n-Hexanol _____g__ | 112 |
| Benzene _____ml__ | 200 |
| p-Toluenesulfonic acid _____g__ | 3 |

The reaction mixture was heated to reflux until the calculated amount of water was formed. It was then cooled, washed with 50 ml. water, neutralized with a 10% sodium carbonate solution, again washed with 50 ml. water and fractioned through a 1½ foot Vigreux column.

The di-hexyl fumarate boiled at 164–165° C. at a 1 mm. vacuum. R.I. 20° C.: 1.4519 and was obtained in an 80% yield of the theoretical.

From the above illustrations and examples, it is clear that the di-esters of fumaric acid having less than 25 carbon atoms effectuate deodorization when employed in the methods and compositions of this invention.

The efficiency of the room deodorants was tested in various experiments. Two compositions of malodors were prepared in accordance with the formula developed by the General Services Administration of the United States Government. One of these malodors was a so-called tobacco smoke odor, while the other comprised the kitchen odor. In the testing, two separate, trained odor jury panels of three males and two females, and two males and three females first determined that the odor test rooms employed were clean and odorless. Into one of the test rooms there was introduced a three second aerosol spray of the malodor under test; e.g. the kitchen odor, while a three second aerosol spray of the other malodor under test was introduced into another room. This procedure was followed in two other rooms which were used as controls. The deodorants containing the fumarate was introduced in the form of a three second aerosol spray into the room containing each of the malodors. Using the trained odor jury panel of three males and two females, and that of three females and two males, the room sprayed with the deodorant was compared with the room containing the malodor without any introduction of the deodorant, one minute after application of the deodorant aerosol and five minutes after the application of the deodorant aerosol. It was found that in the room in which the deodorant was introduced, there was retained a faint but characteristic odor of the deodorant. There was a marked reduction of the malodor level in each of the rooms in which the deodorant was introduced as specified in accordance with the Federal specification of the General Services Administration. The malodors in the control rooms in which no deodorant was introduced persisted most markedly in the same periods that the deodorized rooms showed such striking improvement.

The efficiency of these novel deodorants was furthermore established and proven under actual and varied conditions by extensive applications in households, sick rooms and offices.

What is claimed is:
1. The method of deodorizing a space which comprises spraying into said space a deodorant comprising a di-ester of fumaric acid propelled by a propellant which is gaseous under normal conditions of pressure and temperature but is adapted to be non-gaseous at normal temperatures by application of pressure, said ester having less than 25 carbon atoms.
2. The method of deodorizing a space which comprises spraying into said space finely divided particles of a solution under pressure and comprising a di-ester of fumaric acid in a solvent having a vapor pressure such that it boils under atmospheric pressure, said ester having less than 25 carbon atoms.
3. The method of deodorizing a space in accordance with claim 2, in which the di-ester of fumaric acid is a di-alkylene ester of fumaric acid.
4. The method of deodorizing a space in accordance with claim 2, in which the di-ester of fumaric acid is a di-alkyl ester of fumaric acid.
5. The method of deodorizing a space in accordance with claim 2, in which the di-ester of fumaric acid is a di-aryl hydrocarbon ester of fumaric acid.
6. The method of deodorizing a space in accordance with claim 2, in which the di-ester of fumaric acid is a di-aralkyl hydrocarbon ester of fumaric acid.
7. The method of deodorizing a space in accordance with claim 2, in which the di-ester of fumaric acid is di-geranyl fumarate.
8. The method of deodorizing a space in accordance with claim 2, in which the di-ester of fumaric acid is di-butyl fumarate.
9. The method of deodorizing a space in accordance with claim 2, in which the di-ester of fumaric acid is di-hexyl fumarate.
10. The method of deodorizing a space in accordance with claim 2, in which the di-ester of fumaric acid is di-benzyl fumarate.
11. A deodorant comprising a di-ester of fumaric acid and a propellant gaseous under normal conditions of temperature and pressure but capable of being maintained in a non-gaseous state at normal temperatures by the application of pressure, said ester having less than 25 carbon atoms.
12. A deodorant comprising a di-ester of fumaric acid dissolved in a solvent and a propellant gaseous under normal conditions of temperature and pressure but adapted to be maintained in a non-gaseous state at normal temperatures by the application of pressure, said ester having less than 25 carbon atoms.
13. A deodorant in accordance with claim 12, in which the propellant is a halogenated alkane.
14. A deodorant in accordance with claim 12, in which the di-ester of fumaric acid is a di-alkylene ester of fumaric acid.
15. A deodorant in accordance with claim 12, in which the di-ester of fumaric acid is a di-alkyl ester of fumaric acid.
16. A deodorant in accordance with claim 12, in which the di-ester of fumaric acid is a di-aryl hydrocarbon ester of fumaric acid.
17. A deodorant in accordance with claim 12, in which the di-ester of fumaric acid is a di-aralkyl hydrocarbon ester of fumaric acid.

References Cited in the file of this patent

Moncrieff: The Chemistry of Perfumery Materials, 1949, United Trade Press, London, England, pages 120–130 (particularly page 126).

Chem. Abst. (Subject Index), vol. 52, 1958, page 1146S.

Moncrieff: The Chemistry of Perfumery Materials, 1949, pages 129 and 130.